March 6, 1928.

H. E. KUHNE

PORTABLE INSTRUMENT HOUSING

Filed Sept. 24, 1926    2 Sheets-Sheet 1

1,661,482

H. E. Kuhne    Inventor

By Jesse R. Stone    Attorney

March 6, 1928.

H. E. KUHNE 1,661,482

PORTABLE INSTRUMENT HOUSING

Filed Sept. 24, 1926   2 Sheets-Sheet 2

H.E. Kuhne   Inventor

By Jesse R. Stone
   Attorney

Patented Mar. 6, 1928.

1,651,482

UNITED STATES PATENT OFFICE.

HEINZ E. KUHNE, OF HOUSTON, TEXAS.

PORTABLE INSTRUMENT HOUSING.

Application filed September 24, 1926. Serial No. 137,479.

My invention relates to portable housings for instruments requiring protection from wind and weather. It is particularly adapted to enclose and house the torsion balance or other similar delicate instruments so that they may be used at various scattered locations as desired.

In the use of the torsion balance it is desirable in locating formations or deposits upon the earth's surface to make observations at scattered points over a certain area. But in order to make correct observations and obtain accurate data the instruments must be housed so as to obtain a fairly uniform temperature, not varied by wind or sudden weather changes.

It is an object of the invention to provide a portable housing of light and compact structure which will house a torsion balance or like delicate instrument and allow adjustment therein by an operator.

It is desired that the walls be light, yet resistant to the conduction of heat. It is further contemplated that the parts be secured together by means firmly mounted upon the walls of the housing and not, therefore, subject to being misplaced or lost in use. The walls are designed to be heat insulating and rigidly secured together to provide a reliable housing of the character described.

Figure 2:
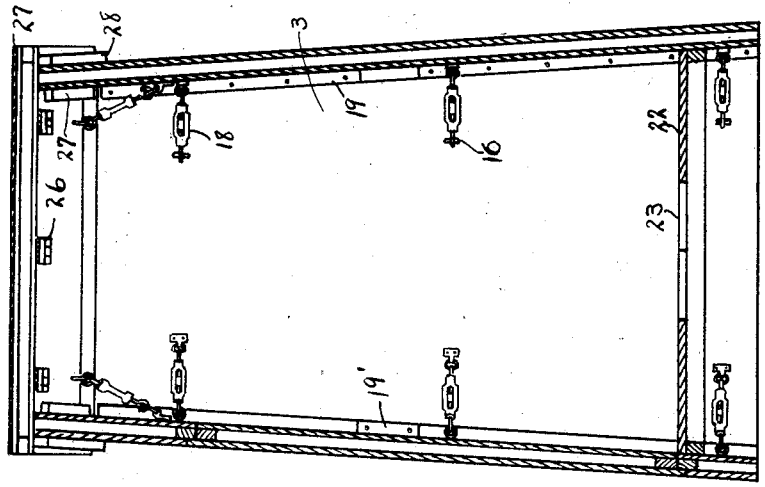
Figure 1:
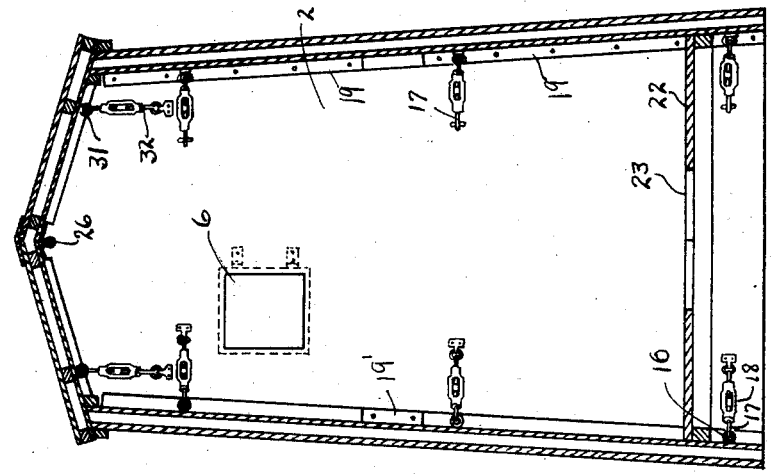
Figure 3:
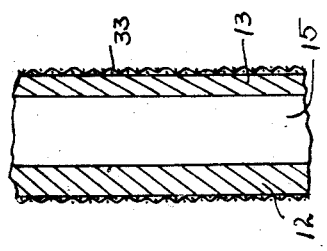
Figure 4:
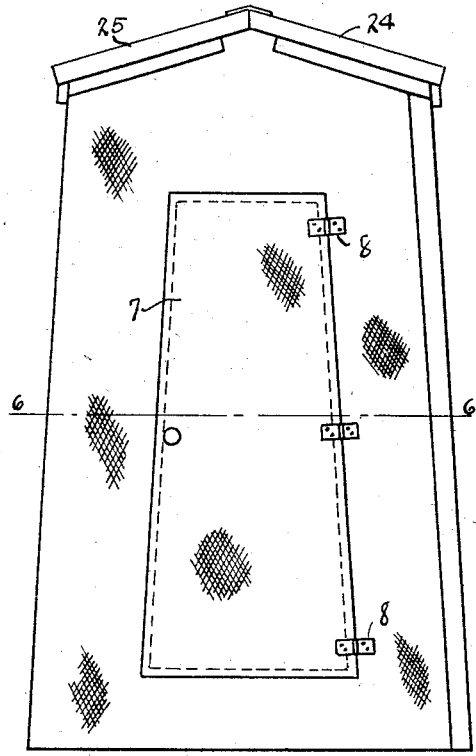
Figure 5:
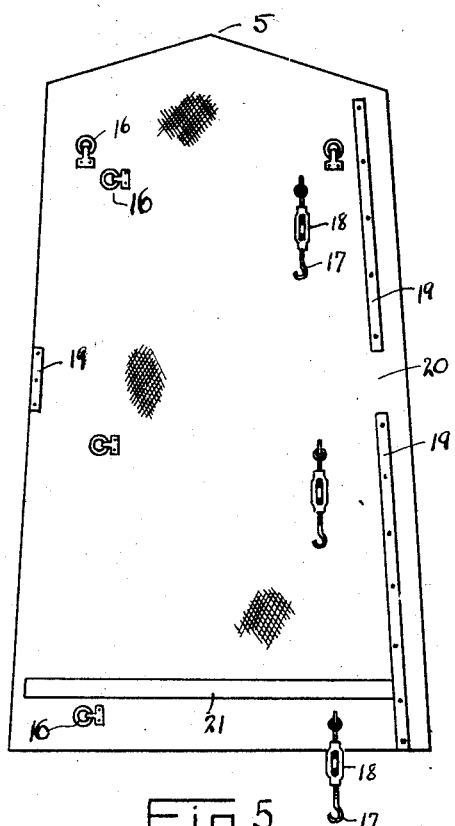
Figure 6:
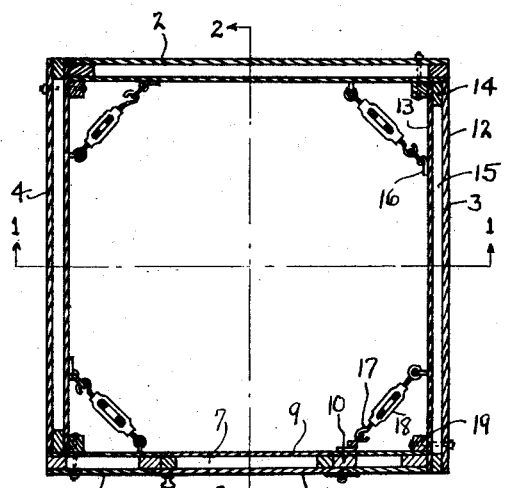
Figure 7:
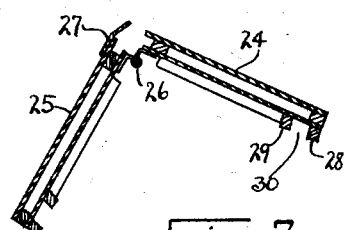

In the drawings herewith, Fig. 1 is a vertical section through my housing transversely of the roof. Fig. 2 is a similar section longitudinally of the roof. Fig. 3 is an enlarged broken detail of a section of the enclosing walls. Fig. 4 is a front elevation of the invention. Fig. 5 is an inside elevation of one of the side walls. Fig. 6 is a transverse horizontal section of the housing. Fig. 7 is a sectional detail of the roof. Like numerals of reference are employed to designate like parts in all the views.

In the drawing I have shown a housing having four side walls and although I do not wish to be confined to the use of four side walls rather than any other particular number, the use of four walls is preferable. The four walls comprise a front wall 1, a rear wall 2 and side walls 3 and 4. Except for the openings therein to provide for ventilation and access to the interior of the housing, the opposite walls are alike in construction. The two side walls are adapted to fit along the sides of the roof adjacent the eaves, while the front and rear walls fit within the gables of the roof, and hence are inclined upwardly toward the center 5, as shown in Fig. 5.

The rear wall 2 has therein at any desired point a window 6 to be covered by a closure hinged thereto, as desired. The forward side of the housing has therein a door 7. As shown in Fig. 4, the door is hinged at one side, shown at 8, the opposite side fitting within the opening and acting to close the said opening tightly at all points. As shown in Fig. 6, the door has an inner plate 9 of the same size as the inner frame 10 which surrounds the door opening and an outer plate 11 overlapping the frame work slightly on all sides, thus making an air-tight closure.

The walls of the housing are made of two similar plates 12 on the outside and 13 on the inside, these plates being spaced apart at their edges by a frame work 14. This provides an air space 15 between the plates which serves as a heat insulating provision to prevent rapid changes of temperature within the housing. Each of the walls of the housing has at one side thereof a plurality of vertical spaced eyelets 16. At the opposite side it has secured pivotally to the wall a hook 17 which has a turn buckle 18 between its ends so as to allow the same to be longitudinally adjustable. As shown particularly with reference to Figs. 1, 2 and 6, the edge of each side adjacent the hooks overlaps the end of the adjacent side wall and the hooks and adjacent eyelets are in alignment so that when the side and end walls are thus interfitted the hooks will engage within the eyelets. The edge adjacent the hooks has an upright cleat 19 thereon, spaced from the edge a sufficient distance to allow the adjacent wall to fit between said cleat and the edge of the side wall. When the hooks have been engaged within the eyelets the turn buckles can be tightened until the walls are drawn rigidly together and held in such manner that no looseness or play of the walls relative to each other is possible. This will be readily understood from Fig. 6. The cleats 19 adjacent the edge of each of the walls are preferably made in two sections, as shown in Fig. 5, the two sections being spaced apart to provide an opening 20 between them to receive a short cleat 19' on the adjacent side wall of the housing. This interfitting of the short cleat 19' with the two longer ones on the adjacent side wall acts to prevent vertical play and thus adds to the rigidity of the structure.

Adjacent the bottom of the side wall a cleat or cross bar 21 is secured to act as a support for the floor 22. The said floor is a single plate or thickness of board or other material having an opening 23 centrally thereof to allow the structure to be placed upon the ground, if desired, the adjacent flooring furnishing a platform upon which the operator may stand in adjusting the instrument.

The roof structure is shown in Fig. 7. It is made up of two walls 24 and 25 of double thickness, as in case of the walls, the adjacent edges at the apex of the roof being hinged together at 26 and on the outer side the section 25 has a ridge plate 27 bent to lap over the edge of the adjacent side 24 and make a weather-tight fit therewith. Adjacent the eaves of the roof are two transverse cleats 28 and 29 spaced apart to provide a recess 30 to fit over the upper end of the side wall upon which it rests. The roof is secured detachably in position upon the tops of the side walls by means of eyelets 31 in the roof positioned adjacent the sides to be engaged by hooks 32 having turn buckles therein as in case of the hooks previously described. By this arrangement, the roof may be drawn tightly in position at the upper part of the housing to make an approximately air-tight fit with the side walls.

As shown in Fig. 3, the outer and inner plates which make up the side walls may have an outer covering 33 of canvas, and I contemplate that this canvas will be weather proof so that the walls will be practically impervious to moisture.

As will be noted from the drawing, the sides of the housing making up the enclosure are of approximately equal size so that the enclosure is nearly square. This has the advantage that the sides may be detached one from the other through the unhooking of the hooks from the eyelets and the walls placed one against the other into a compact relation so that the housing may be easily portable. The roof, when detached, may be folded in the middle about the hinge 26 and will thus be in compact form so as to be easily shipped.

It is a feature of advantage in my structure that the hooks and eyelets employed in securing the side walls and the roof in position relative to each other are secured firmly to the walls and to the roof. When they are detached from each other they are still held in position where they will not be lost when the housing is transported from one position to another, and when the walls are assembled in position the hooks and eyelets are in position to be used without any necessity of searching for the missing parts. The use of the turn buckle within the hook makes it possible to obtain an exceptionally rigid connection between the side walls so that the housing will be substantially airtight.

In the use of this housing, the walls will be set in position and locked together and the roof and floor installed, and while the instrument is being set in position, the window and door may be opened to provide ventilation for the operator. After the instrument has been installed and ready to make readings or observations therefrom, the window and door may be closed and the instrument left in adjusted position so that the readings may be accurately taken. The walls being heat insulated will maintain the temperature within the housing from varying due to external causes, such as wind or clouds or storms arising, making it possible to take continuous and accurate readings within the interior of the housing.

It is believed that the advantages of this structure will be apparent without further description.

What I claim as new and desire to protect by Letters Patent is:

1. A portable housing having side walls, means to bring said walls into rigid connection with each other, a roof centrally hinged and shaped to engage said walls at its edges and adjustable means to draw said roof into locked position on said walls, said walls and roof being formed of spaced plates enclosing an air space, for the purpose described.

2. A portable housing having side walls adapted to accurately interfit with each other, a plurality of eyelets adjacent one edge of each wall, longitudinally adjustable hooks on the adjacent wall to engage therewith to bring said walls into rigid connection with each other, said walls being made waterproof and heat insulating, and a roof of similar construction.

3. In a housing, side walls detachably secured together, said walls being made of two spaced plates enclosing an air space between them, a waterproof covering over said walls, a roof detachably secured to said side walls, and a floor supported on said side walls.

4. In a housing, side walls, upright sectional cleats thereon adjacent one edge, there being a space between adjacent sections, a short cleat on the opposite edge adapted to fit within the space between the sections of the cleat on the adjacent side wall, and longitudinally adjustable means securing adjacent side walls rigidly together, with said cleats interlocked as described.

5. A housing of the character described comprising side walls tapered upwardly, means to allow adjacent side walls to interfit, a plurality of hooks having turn buckles therein secured adjacent one edge of each wall, means to receive said hooks mounted in aligned position near the opposite edge of each wall, and a roof on said walls, and hooks to secure said roof detachably in position.

In testimony whereof I hereunto affix my signature this 11th day of September, A. D. 1926.

HEINZ E. KUHNE.